United States Patent
Takahashi et al.

(10) Patent No.: US 7,037,025 B2
(45) Date of Patent: May 2, 2006

(54) ATTACHING DEVICE FOR FUEL TANK BAND

(75) Inventors: Shigeru Takahashi, Toyota (JP); Chiaki Kataoka, Toyota (JP); Toru Tanaka, Toyota (JP)

(73) Assignee: Nifco Inc., Yokohama (JP)

( * ) Notice: Subject to any disclaimer, the term of this patent is extended or adjusted under 35 U.S.C. 154(b) by 49 days.

(21) Appl. No.: 10/667,441

(22) Filed: Sep. 23, 2003

(65) Prior Publication Data
US 2004/0105723 A1 Jun. 3, 2004

(30) Foreign Application Priority Data
Nov. 29, 2002 (JP) ............... 2002-347524

(51) Int. Cl.
B25G 3/38 (2006.01)
(52) U.S. Cl. ............ 403/282; 403/289; 403/397; 24/24; 24/25
(58) Field of Classification Search ......... 403/397, 403/321, 326, 274, 282, 289, 292; 24/455, 24/20 R, 24, 25
See application file for complete search history.

(56) References Cited

U.S. PATENT DOCUMENTS

| | | | | | |
|---|---|---|---|---|---|
| 4,212,303 | A | * | 7/1980 | Nolan | 606/120 |
| 4,325,526 | A | | 4/1982 | Kitagawa | |
| 4,667,375 | A | * | 5/1987 | Enlund | 24/274 R |
| D308,017 | S | * | 5/1990 | Fujioka | D8/396 |
| 5,029,782 | A | * | 7/1991 | Andre et al. | 248/68.1 |
| 5,339,500 | A | * | 8/1994 | Muller et al. | 24/514 |
| 5,535,969 | A | * | 7/1996 | Duffy, Jr. | 248/68.1 |
| 5,820,048 | A | * | 10/1998 | Shereyk et al. | 248/68.1 |
| 6,105,218 | A | * | 8/2000 | Reekie | 24/518 |
| 6,164,603 | A | * | 12/2000 | Kawai | 248/73 |
| 6,164,604 | A | * | 12/2000 | Cirino et al. | 248/74.3 |
| 6,171,014 | B1 | * | 1/2001 | Meyer | 403/397 |
| 6,402,417 | B1 | * | 6/2002 | Okamoto | 403/322.1 |
| 6,494,412 | B1 | * | 12/2002 | Gombert | 248/65 |
| 6,708,933 | B1 | * | 3/2004 | Girodo | 248/74.2 |
| 6,732,983 | B1 | * | 5/2004 | Blake et al. | 248/74.2 |

FOREIGN PATENT DOCUMENTS

| | | |
|---|---|---|
| GB | 867 938 | 5/1961 |
| GB | 1 187 422 | 4/1970 |
| GB | 1 500 698 | 2/1978 |
| GB | 2 181 778 | 4/1987 |
| JP | 11-278067 | 10/1999 |

* cited by examiner

*Primary Examiner*—Gary S. Hartmann
(74) *Attorney, Agent, or Firm*—Manabu Kanesaka

(57) ABSTRACT

An attaching structure attaches a part to a band, and includes a clip for attaching the part to the band. The clip includes a clip main member, which has a lower portion and an upper portion with a gap corresponding to a cross section of a portion of the band where the clip is attached for sandwiching the portion of the band where the clip is attached, and a part engaging portion formed below the clip main member for engaging the part.

11 Claims, 9 Drawing Sheets

Fig. 4
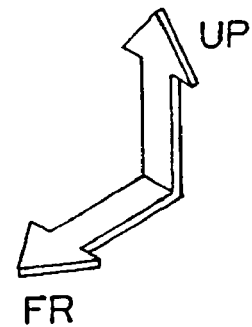
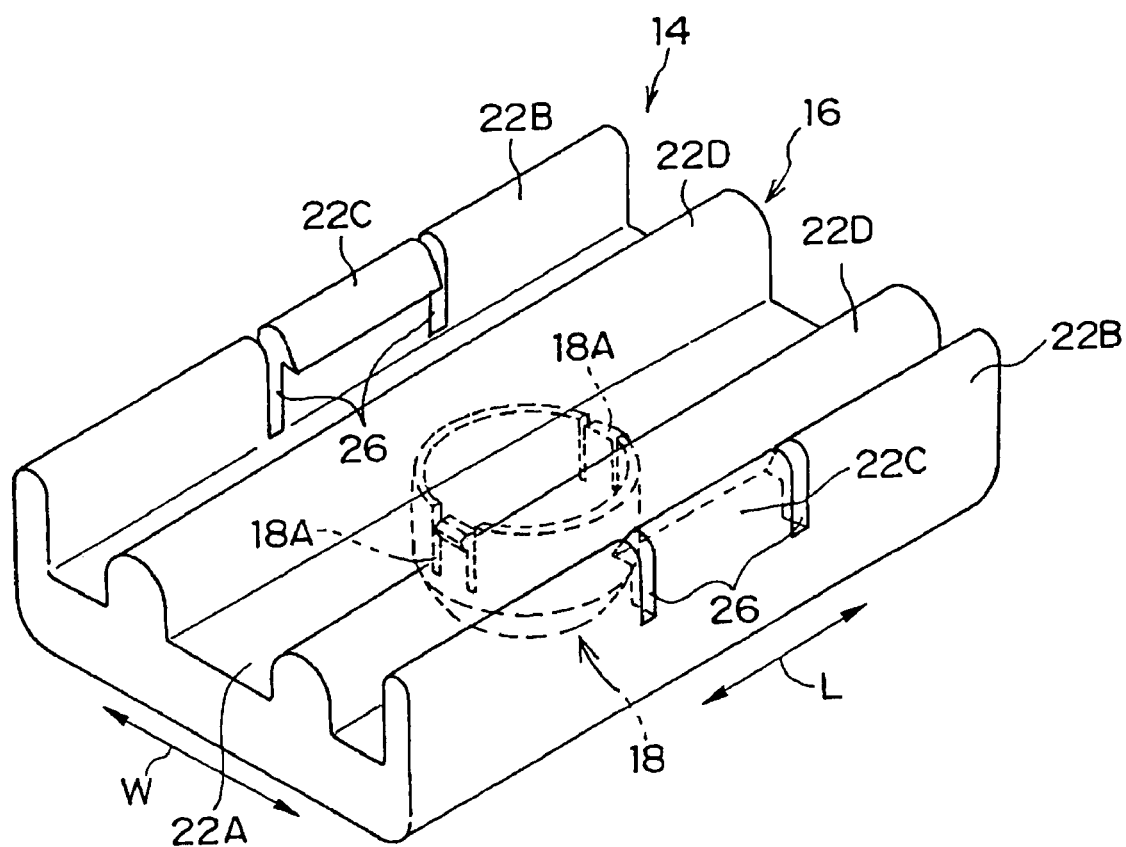

ATTACHING DEVICE FOR FUEL TANK BAND

BACKGROUND OF THE INVENTION AND RELATED ART STATEMENT

The present invention relates to an attaching device for attaching a part to a fuel tank band, especially, to an attaching structure for attaching a part to a fuel tank band in a vehicle such as an automobile.

Conventionally, there has been known a structure of a fuel tank in a vehicle such as an automobile in which the fuel tank is disposed on two brackets projecting from side frames of the vehicle in a width direction (refer to Patent Reference No.1).

Patent Reference No. 1

Japanese Patent Publication (Kokai) No. 11-278067 (paragraph [0008], FIG. 3, FIG. 4)

However, in the structure disclosed in Patent Reference No. 1, the fuel tank is fixed to the brackets with a fuel tank band, and a part such as a heat insulator is attached through a bracket welded to the fuel tank band. As a result, when a cross section of the fuel tank band is changed to a corrugated shape from a flat plate to increase rigidity of the fuel tank band for improving a supporting rigidity of the fuel tank made of resin, the fuel tank band does not have a flat surface for welding the bracket. Therefore, it is impossible to fix the bracket to the fuel tank band and attach the part to the fuel tank band through the bracket.

In view of the problems described above, an object of the present invention is to provide an attaching structure for attaching a part to a fuel tank band while enough rigidity of the fuel tank band is maintained.

Further objects and advantages of the invention will be apparent from the following description of the invention.

SUMMARY OF INVENTION

According to the first aspect of the present invention, an attaching structure is provided for attaching a part to a fuel tank band. The attaching structure comprises a clip for attaching the part to the fuel tank band. The clip includes a clip main member, which has a lower portion and an upper portion formed in a shape with a gap corresponding to a cross section of a portion of the fuel tank band where the clip is attached for sandwiching the portion of the fuel tank band where the clip is attached, and a part engaging portion formed below the clip main member for engaging the part.

Accordingly, even when the cross section of the fuel tank band is changed from a flat shape to a corrugated shape to secure rigidity of the fuel tank band, since the lower portion and the upper portion are formed in a shape corresponding to the cross section of the portion of the fuel tank band where the clip is attached, and the lower portion and the upper portion sandwich the portion of the fuel tank band where the clip is attached, the clip for the fuel tank band can be fixed to the fuel tank band. Also, a part engages the part engaging portion formed on the lower part of the clip main member in the clip, so that the part can be attached to the fuel tank band through the clip.

According to the second aspect of the present invention, in the attaching structure for attaching a part to the fuel tank band, the upper part and the lower part of the clip main member are separate members.

Accordingly, in addition to the features in the first aspect, since the upper part and the lower part of the clip main member are the separate members, it is easy to simplify a shape of a mold, thereby reducing a cost.

According to the third aspect of the invention, in the attaching structure for attaching a part to the fuel tank band in the first or second aspect, the cross section of the fuel tank band where the clip is attached is different from a cross section of other portion of the fuel tank band.

Accordingly, in addition to the features in the first aspect or second aspect, since the cross section of the fuel tank band where the clip is attached is different from a cross section of other portion of the fuel tank band, when the clip for the fuel tank band moves along the fuel tank band from the clip attaching portion of the fuel tank band, the other portion of the fuel tank band with the different cross section from the clip attaching portion interferes with the clip main member of the clip for the fuel tank band. As a result, it is possible to prevent the clip for the fuel tank band from moving.

BRIEF DESCRIPTION OF THE DRAWINGS

FIG. 4 is a perspective view showing a lower part of a clip main member in the attaching structure for attaching a part to the fuel tank band seen from an upper front side of a vehicle according to the first embodiment of the present invention;

DETAILED DESCRIPTION OF PREFERRED EMBODIMENTS

Figure 1:
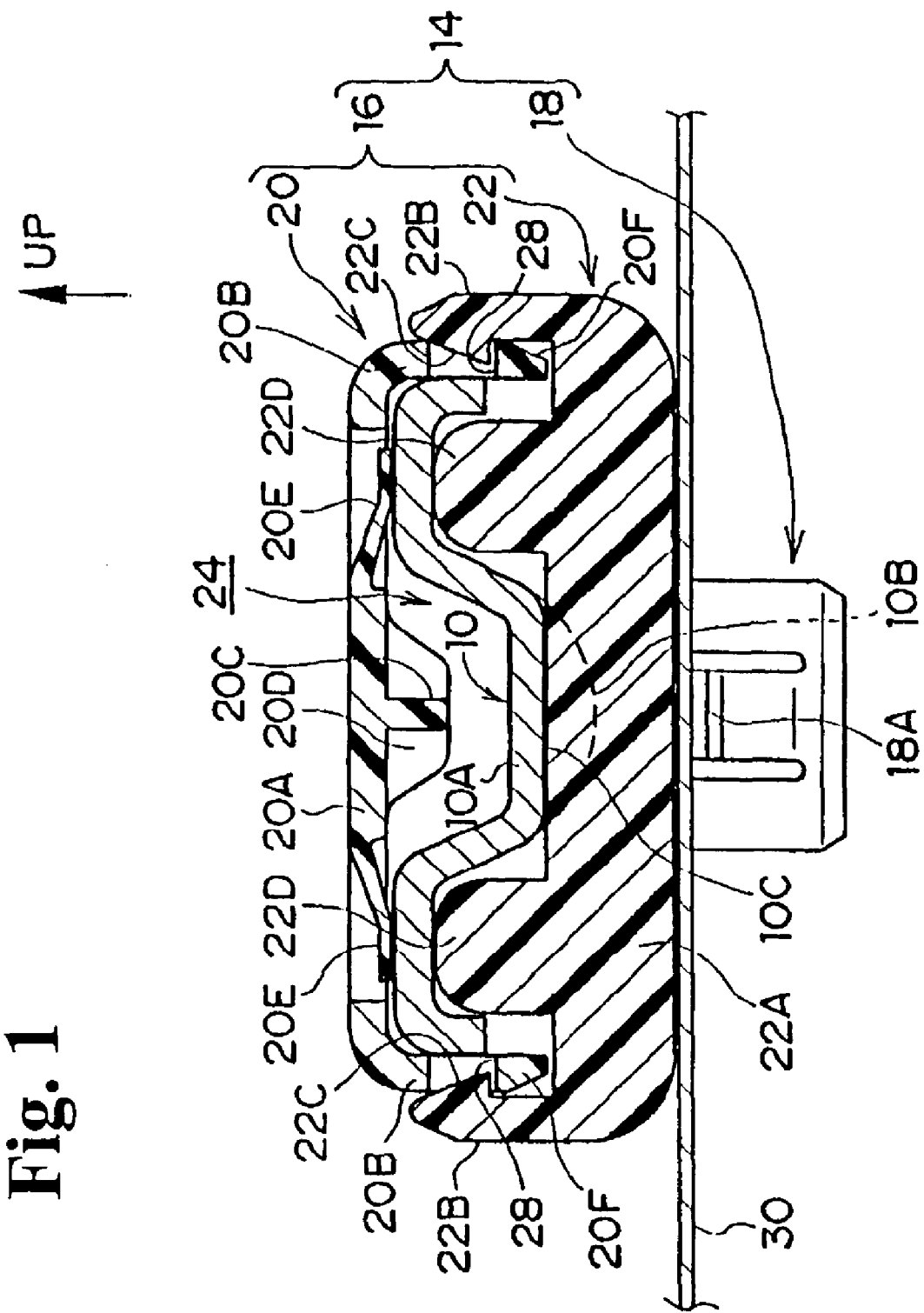
FIG. 1 is an enlarged sectional view taken along line 1—1 in FIG. 2.

With reference to FIGS. 1–5, an attaching structure for attaching a part to a fuel tank band in the first embodiment of the present invention will be explained.

Incidentally, in the drawings, an arrow FR shows a forward-to-rear direction of a vehicle, and an arrow UP shows an upward direction of the vehicle.

Figure 2:
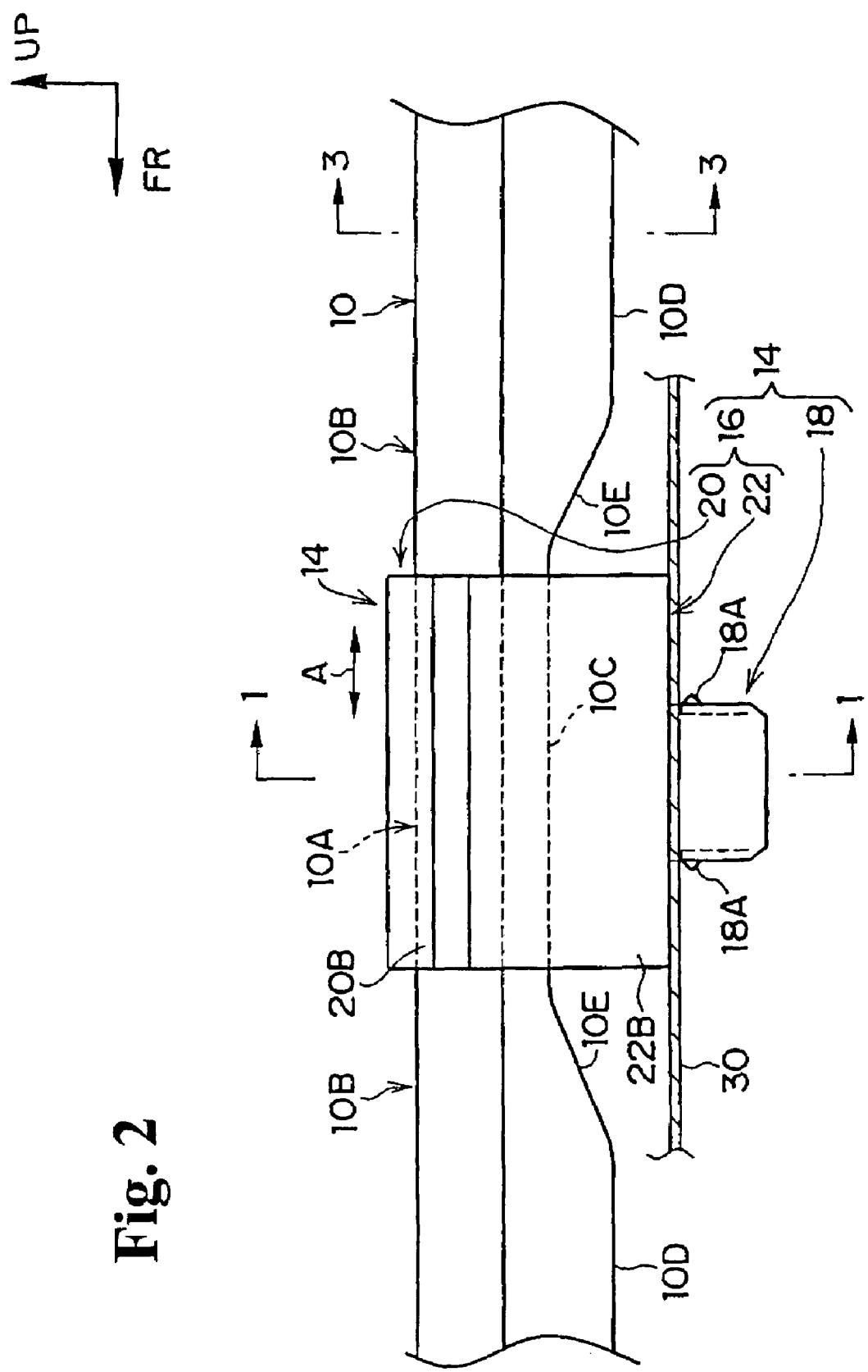
FIG. 2 is a side view showing an attaching structure for attaching a part to a fuel tank band according to the first embodiment of the present invention.

As shown in FIG. 2, in the present embodiment, a clip attaching portion 10A is formed on a fuel tank band 10 for supporting the fuel tank, and a clip 14 for the fuel tank band is fixed to the clip attaching portion 10A. Also, the clip attaching portion 10A of the fuel tank band 10 (refer to FIG. 1) has a cross section different from that of other portion 10B (refer to FIG. 3) of the fuel tank band 10. That is, in the fuel tank band 10, a lower wall 10D of the other portion 10B projects downwardly toward the vehicle lower than a lower wall 10C of the clip attaching portion 10A. In a side view, in the fuel tank band 10, the lower wall 10C of the clip attaching portion 10A is located above the lower wall 10D of the other portion 10B on the vehicle. In the other portion 10B of the fuel tank band 10 near the clip attaching portion 10A, the projecting amounts of the lower wall 10C projecting downwardly toward the vehicle decrease gradually to form inclined portions 10E.

Figure 3:
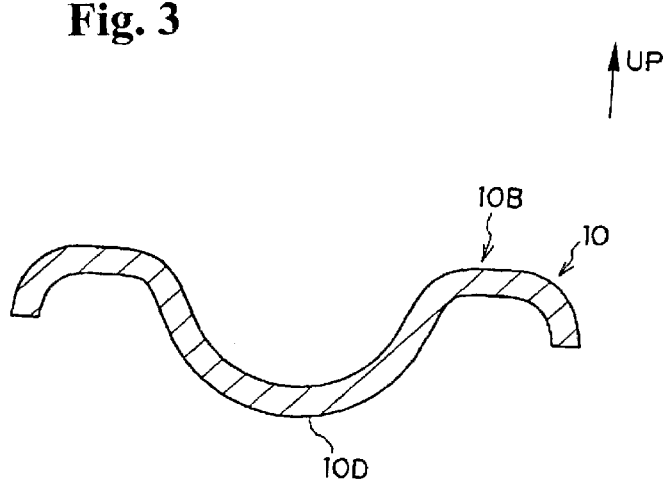
FIG. 3 is an enlarged sectional view taken along line 3—3 in FIG. 2.

Moreover, while the clip attaching portion 10A of the fuel tank band 10 has a cross section in which the lower wall 10C is flat as shown in FIG. 1, the other portion of the fuel tank band 10 except the clip attaching portion 10A has a cross section in which the lower wall 10D projects downwardly toward the vehicle in an arc-shape as shown in FIG. 3.

As shown in FIG. 1, the clip 14 for the fuel tank band is made of resin, and includes a clip main member 16 for sandwiching the clip attaching portion 10A of the fuel tank band 10, and a part engaging portion 18 disposed below the clip main member 16.

Also, the clip main member 16 of the clip 14 for the fuel tank band is divided into an upper part 20, and a lower part 22 as separate members. A gap 24 corresponding to the cross section of the clip attaching portion 10A of the fuel tank band 10 is formed between the upper part 20 and the lower part 22.

As shown in FIG. 4, the part engaging portion 18 of the clip 14 for the fuel tank band is formed at a central part of a lower surface of the base portion 22A of the lower part 22 of the clip main member 16. The part engaging portion 18 is formed in a cylindrical shape and has engaging claws 18A formed on an outer circumference thereof.

Walls 22B are formed upwardly at both ends of the base portion 22A of the lower part 22 of the clip main member 16 in a width direction (an arrow direction W in FIG. 4). Engaging claws 22C are formed at central parts of the walls 22B in a longitudinal direction (an arrow direction L in FIG. 4). Also, slits 26 are formed at both sides of the engaging claw 22C. Each of the walls 22B and engaging claws 22C has an end having a semicircle cross-section in consideration of assembly to the upper part 20 of the clip main member 16.

Two projections 22D are formed on an upper surface of the base portion 22A of the lower part 22 of the clip main member 16 in the longitudinal direction with a specific interval in the width direction, and each of the projections 22D has an end having a semicircle cross-section.

Figure 5:
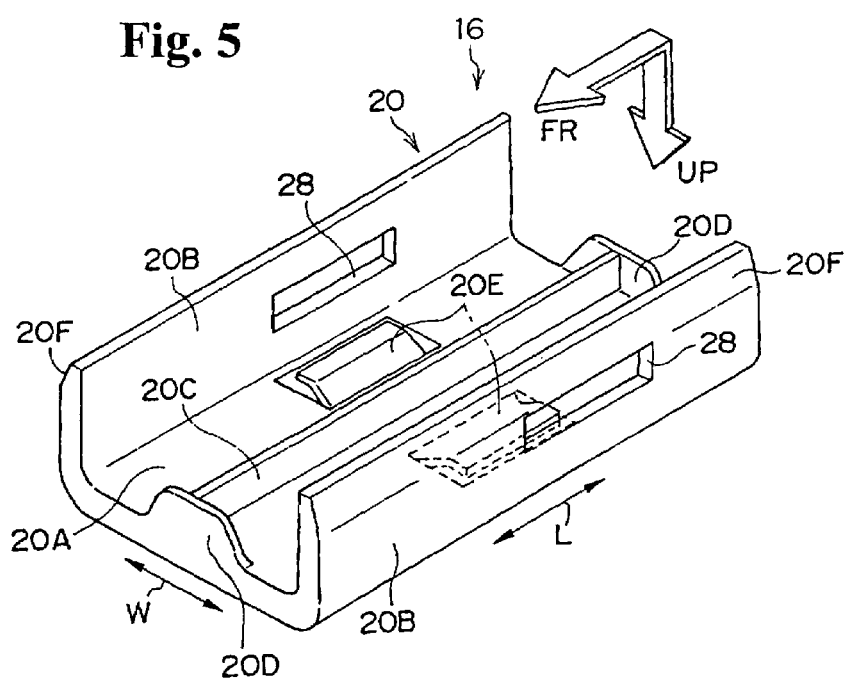
FIG. 5 is a perspective view showing an upper part of the clip main member in the attaching structure for attaching a part to the fuel tank band seen from a lower front side of the vehicle according to the first embodiment of the present invention.

As shown in FIG. 5, walls 20B are formed downwardly at both ends of the base portion 20A of the upper part 20 of the clip main member 16 in a width direction (an arrow direction W in FIG. 5). Engaging holes 28 are formed at a central part of the walls 20B in the longitudinal direction (an arrow direction L in FIG. 5). Also, a wall 20C is formed at a central part in the width direction of a lower surface of the base portion 20A of the upper part 20 of the clip main member 16 in the longitudinal direction. Reinforcing portions 20D extending in the width direction are formed at both ends of the wall 20C.

A pair of wings 20E is formed downwardly on both sides of the wall 20C at a central part of the base portion 20A of the upper part 20 of the clip main member 16 in the longitudinal direction. The wings 20E can elastically deform upwardly.

As shown in FIG. 1, the engaging claws 22C at the lower part 22 of the clip main member 16 engage the engaging holes 28 at the upper part 20 from the outside of the upper part 20, so that the lower part 22 and the upper part 20 of the clip main member 16 sandwich the clip attaching portion 10A of the fuel tank band 10. Also, the wings 20E of the upper part 20 of the clip main member 16 press the clip attaching portion 10A of the fuel tank band 10 against the projections 22D of the lower part 22 with an elastic force. Moreover, a heat insulator 30 as a part is fixed between the base portion 22A at the lower part 22 of the clip main member 16 and the engaging claws 18A of the part engaging portion 18.

Inclined faces 20F are formed at outside ends of the walls 20B of the upper part 20 of the clip main member 16, and are used as a guide when the lower part 22 is assembled.

An operation of the present embodiment will be explained next.

As shown in FIG. 1, in the present embodiment, the upper part 20 and the lower part 22 of the clip main member 16 of the clip 14 for the fuel tank band have the gap 24 corresponding to the cross section of the clip attaching portion 10A of the fuel tank band 10, and sandwich the clip attaching portion 10A of the fuel tank band 10, so that the clip 14 for the fuel tank band is fixed to the fuel tank band 10.

As a result, even in the case that the cross section of the fuel tank band 10 is changed to a corrugated shape from a flat shape to secure rigidity of the fuel tank band 10 as shown in FIGS. 1 and 3, the clip 14 for the fuel tank band can be fixed to the fuel tank band 10.

Also, the heat insulator 30 engages the engaging claws 18A of the part engaging portion 18 formed below the clip main member 16 of the clip 14 for the fuel tank band, so that the heat insulator 30 is attached to the fuel tank band 10 through the clip 14 for the fuel tank band.

As a result, the cross section of the fuel tank band 10 is made in a corrugated shape, not a flat shape to secure rigidity of the fuel tank band 10 as shown in FIGS. 1 and 3, and also, the heat insulator 30 can be attached to the fuel tank band 10. Further, as compared to a conventional tightening by a bolt, it is possible to reduce the number of parts, assembling hours, and weight of the device, and also possible to improve corrosion resistance and serviceability.

In the present embodiment, in the clip 14 for the fuel tank band, the wings 20E of the upper part 20 of the clip main member 16 press the clip attaching portion 10A of the fuel tank band 10 against the projections 22D of the lower part 22 with an elastic force. As a result, it is possible to prevent rattling of the clip 14 for the fuel tank band after the assembly and a squeaking noise thereof.

In the present embodiment, in the clip 14 for the fuel tank band, the upper part 20 and the lower part 22 of the clip main member 16 are separate members, thereby making a shape of a mold simple and reducing a cost. Moreover, the engaging claws 22C of the lower part 22 of the clip main member 16 shown in FIG. 4 engage the engaging holes 28 of the upper part 20 shown in FIG. 5. Thus, the lower part 22 of the clip main member 16 is easily fitted to the upper part 20, and it is possible to prevent a shift between the lower part 22 and the upper part 20 of the clip main member 16 after the assembly.

In the present embodiment, the clip attaching portion 10A (refer to FIG. 1) of the fuel tank band 10 has the cross section different from that of the other portion 10B (refer to FIG. 3) of the fuel tank band 10. Thus, when the clip 14 for the fuel tank band moves from the clip attaching portion 10A along the fuel tank band 10 in the front-to-rear direction of the vehicle (an arrow direction A in FIG. 2), the other portion 10B of the fuel tank band 10 with the different cross section interferes with the clip main member 16 of the clip 14 for the fuel tank band. As a result, the clip 14 for the fuel tank band is stopped from moving in the arrow direction A.

The second embodiment of an attaching structure for a fuel tank band according to the present invention will be explained next with reference to FIGS. 6 and 7.

The same components in the first embodiment are marked with the same numbers, and explanations thereof are omitted.

Figure 6:
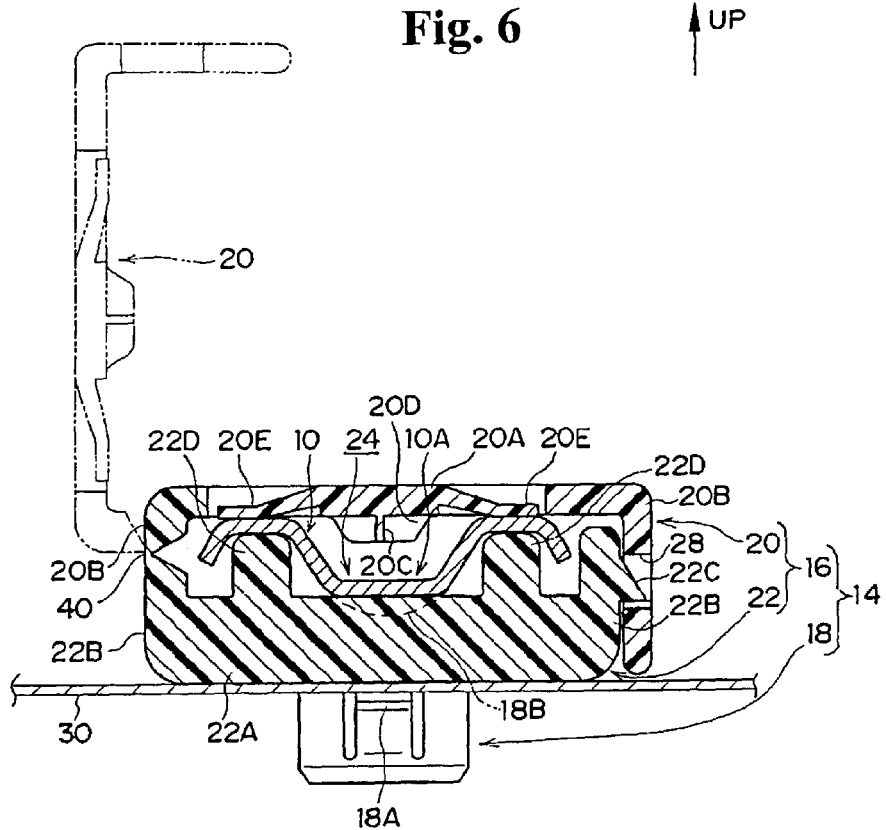
FIG. 6 is a cross sectional view of an attaching structure for attaching a part to the fuel tank band corresponding to FIG. 1 according to the second embodiment of the present invention.

As shown in FIG. 6, in the present embodiment, the clip 14 for the fuel tank band is made of resin, and includes the clip main member 16 for sandwiching the clip attaching portion 10A of the fuel tank band 10 and the part engaging portion 18 formed below the clip main member 16.

Also, the clip main member 16 of the clip 14 for the fuel tank band has an integrated structure in which the upper part 20 and the lower part 22 are connected by an integral hinge 40. When the upper part 20 is rotated from an open position shown with phantom lines in FIG. 6 to a close position shown with solid lines in FIG. 6 around the integral hinge 40, the gap 24 corresponding to the cross section of the clip attaching portion 10A of the fuel tank band 10 is formed between the upper part 20 and the lower part 22.

Figure 7:
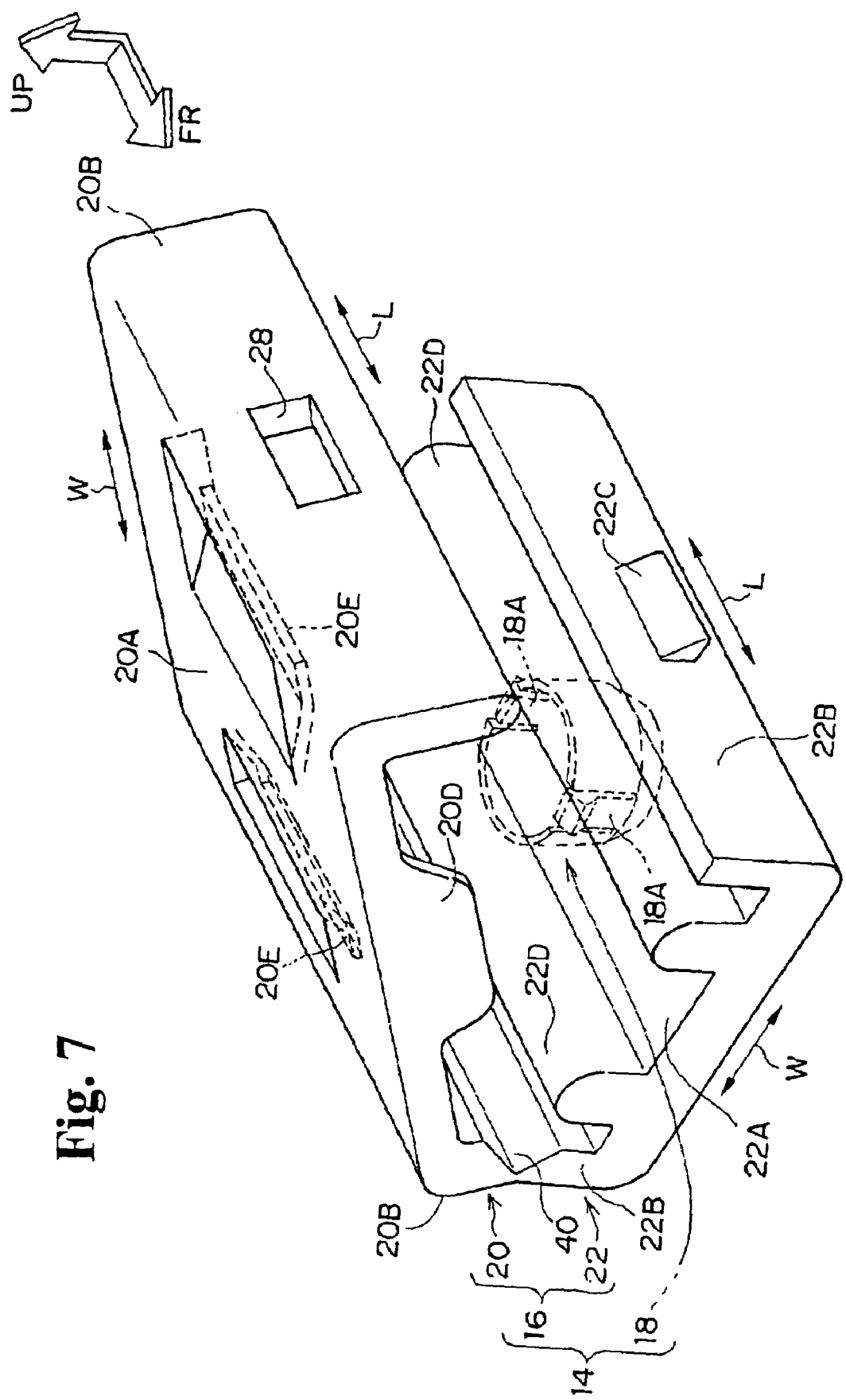
FIG. 7 is a perspective view showing a clip main member in the attaching structure for attaching a part to the fuel tank band seen from an upper front side of the vehicle according to the second embodiment of the present invention.

As shown in FIG. 7, walls 22B are formed upwardly at both ends of the base portion 22A of the lower part 22 of the clip main member 16 in a width direction (an arrow direction W in FIG. 7), and one of the walls 22B has an engaging claw 22C at a central part thereof in a longitudinal direction (an arrow direction L in FIG. 7).

Walls 20B are formed downwardly at both ends of the base portion 20A of the upper part 20 of the clip main member 16 in the width direction (the arrow direction W in FIG. 7), and an end of one of the walls 20B and an end of one of the walls 22B of the lower part 22 are connected by the integral hinge 40. Also, an engaging hole 28 is formed at a central part of the other wall 20B of the upper part 20 of the clip main member 16 in the longitudinal direction (the arrow direction L in FIG. 7).

As shown in FIG. 6, the engaging claw 22C of the lower part 22 of the clip main member 16 engages the engaging hole 28 of the upper part 20 from the inside of the upper part 20, so that the lower part 22 and the upper part 20 of the clip main member 16 sandwich the clip attaching portion 10A of the fuel tank band 10. Also, the wings 20E of the upper part 20 of the clip main member 16 press the clip attaching portion 10A of the fuel tank band 10 against the projections 22D of the lower part 22 with elastic forces. Moreover, the heat insulator 30 as a part is fixed between the base portion 22A of the lower part 22 of the clip main member 16 and the engaging claws 18A of the part engaging portion 18.

An operation of the present embodiment will be explained next.

In the present embodiment, as shown with solid lines in FIG. 6, the upper part 20 and the lower part 22 of the clip main member 16 of the clip 14 for the fuel tank band form the gap 24, corresponding to the cross section of the clip attaching portion 10A of the fuel tank band 10, and sandwich the clip attaching portion 10A of the fuel tank band 10, so that the clip 14 for the fuel tank band can be fixed to the fuel tank band 10.

As a result, even when the cross section of the fuel tank band 10 is changed to a corrugated shape, not a flat shape, to secure rigidity of the fuel tank band 10, the clip 14 for the fuel tank band can be fixed to the fuel tank band 10.

Also, the heat insulator 30 engages the engaging claws 18A of the part engaging portion 18 formed below the clip main member 16 of the clip 14 for the fuel tank band, so that the heat insulator 30 can be attached to the fuel tank band 10 through the clip 14 for the fuel tank band by being.

As a result, it is possible to change the cross section of the fuel tank band 10 to the corrugated shape, not the flat shape, to secure the rigidity of the fuel tank band 10, and attach the heat insulator 30 to the fuel tank band 10. Moreover, as compared to a conventional tightening by a bolt, it is possible to reduce the number of parts, assembling hours, and weight of the device, and also possible to improve corrosion resistance and serviceability.

In the present embodiment, in the clip 14 for the fuel tank band, the wings 20E of the upper part 20 of the clip main member 16 press the clip attaching portion 10A of the fuel tank band 10 against the projections 22D of the lower part 22 with an elastic force. As a result, it is possible to prevent rattling of the clip 14 for the fuel tank band after the assembly and a squeaking noise thereof.

In the present embodiment, in the clip main member 16 of the clip 14 for the fuel tank band, the upper part 20 is integrated with the lower part 22, thereby further reducing the number of parts.

The third embodiment of an attaching structure for a fuel tank band according to the present invention will be explained next with reference to FIGS. 8 and 9. The same components as those in the first embodiment are marked with the same numbers, and explanations thereof are omitted.

Figure 8:
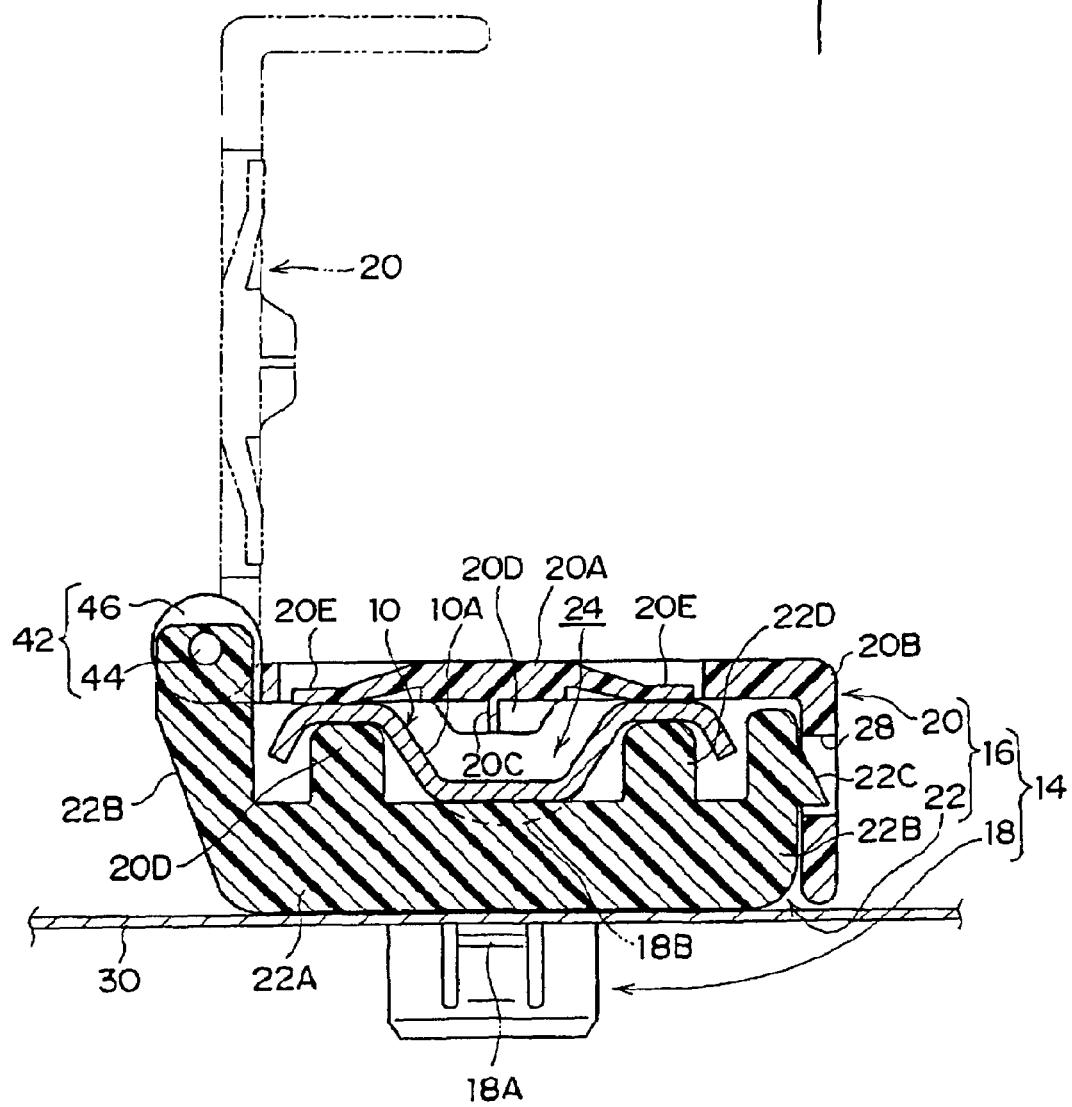
FIG. 8 is a cross sectional view of an attaching structure for attaching a part to the fuel tank band corresponding to FIG. 1 according to the third embodiment of the present invention.

As shown in FIG. 8, in the present embodiment, the clip 14 for the fuel tank band is made of resin, and includes the clip main member 16 for sandwiching the clip attaching portion 10A of the fuel tank band 10 and the part engaging portion 18 formed below the clip main member 16.

Also, the clip main member 16 of the clip 14 for the fuel tank band is divided into the upper part 20 and the lower part 22, and both parts are separate members and connected by the hinge 42. Therefore, when the upper part 20 is rotated from the open position shown with phantom lines in FIG. 8 to the close position shown with solid line in FIG. 8 around the hinge 42, the gap 24 corresponding to the cross section of the clip attaching portion 10A of the fuel tank band 10 is formed between the upper part 20 and the lower part 22.

Figure 9:
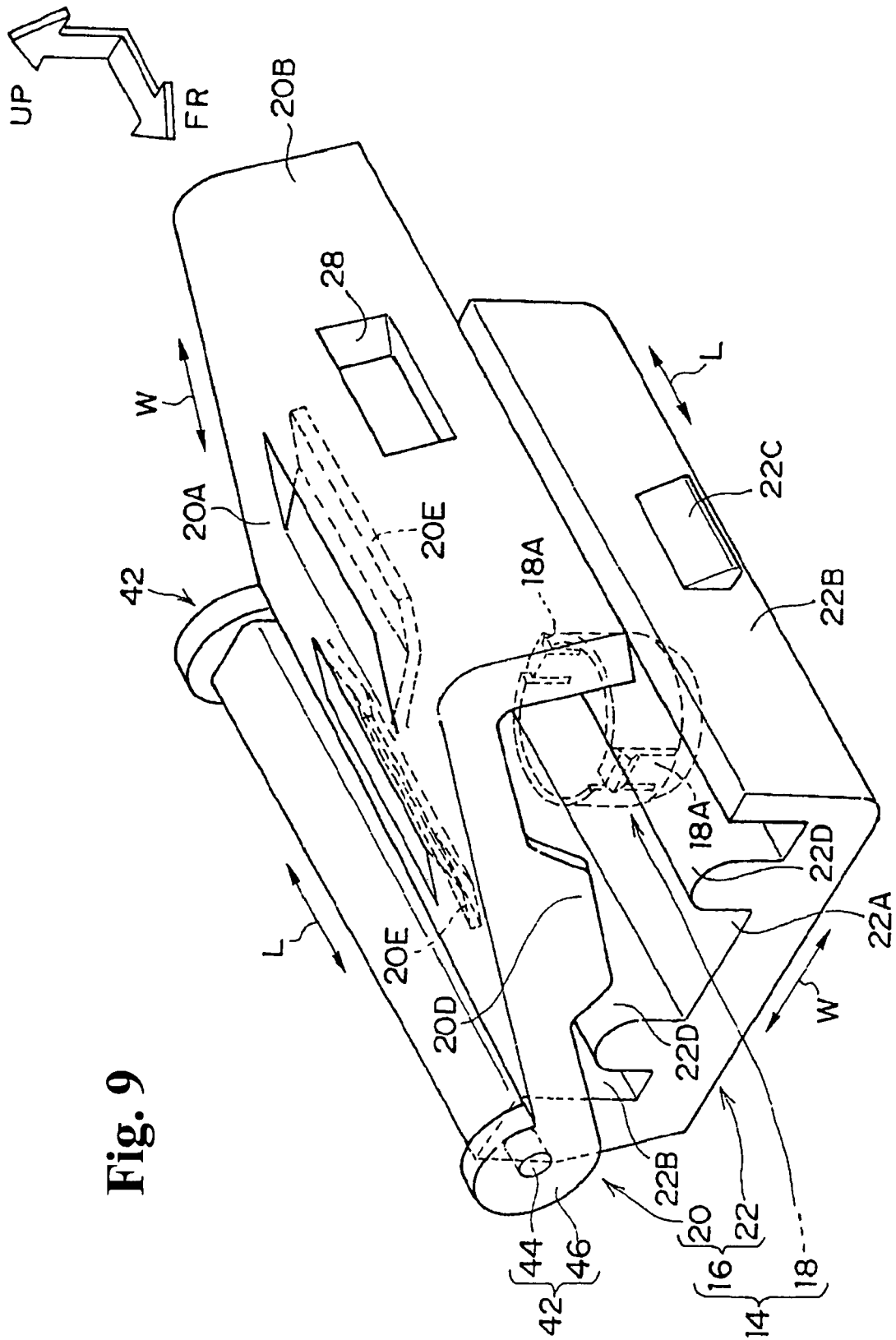
FIG. 9 is a perspective view showing a clip main member in the attaching structure for attaching a part to the fuel tank band seen from an upper front side of the vehicle according to the third embodiment of the present invention.

As shown in FIG. 9, walls 22B are formed upwardly at both ends of the base portion 22A of the lower part 22 of the clip main member 16 in a width direction (an arrow direction W in FIG. 9). An engaging claw 22C is formed at a central part of one of the walls 22B in the longitudinal direction (an arrow direction L in FIG. 9). Also, hinge axes 44 project at both front and rear ends of the other wall 22B of the lower part 22 of the clip main member 16 in the longitudinal direction (the arrow direction L in FIG. 9).

Ring-shaped bearings 46 are formed at both front and rear ends of the base portion 20A of the upper part 20 of the clip main member 16 in the width direction (the arrow direction W in FIG. 9), and the hinge axes 44 pass through the bearings 46 to be rotatable.

A wall 20B is formed downwardly at the other end of the base portion 20A of the upper part 20 of the clip main member 16 in the width direction (the arrow direction W in FIG. 9), and the engaging hole 28 is formed at a central part of the other wall 20B of the upper part 20 of the clip main member 16 in the longitudinal direction (the arrow direction L in FIG. 9).

As shown in FIG. 8, the engaging claw 22C of the lower part 22 of the clip main member 16 engages the engaging hole 28 of the upper part 20 from the inside of the upper part 20, so that the lower part 22 and the upper part 20 of the clip main member 16 sandwich the clip attaching portion 10A of the fuel tank band 10. Also, the wings 20E of the upper part 20 of the clip main member 16 press the clip attaching portion 10A of the fuel tank band 10 against the projections 22D of the lower part 22 with elastic forces. Moreover, the heat insulator 30 as a part is fixed between the base portion 22A of the lower part 22 of the clip main member 16 and the engaging claws 18A of the part engaging portion 18.

An operation of the present embodiment will be explained next.

In the present embodiment, as shown with solid lines in FIG. 8, the upper part 20 and the lower part 22 of the clip main member 16 of the clip 14 for the fuel tank band has the gap 24 corresponding to the cross section of the clip attaching portion 10A of the fuel tank band 10, and sandwich the clip attaching portion 10A of the fuel tank band 10, so that the clip 14 for the fuel tank band can be fixed to the fuel tank band 10.

As a result, even when the cross section of the fuel tank band 10 is changed to a corrugated shape, not a flat shape, to secure the rigidity of the fuel tank band 10, the clip 14 for the fuel tank band can be fixed to the fuel tank band 10.

Also, the heat insulator 30 engages the engaging claws 18A of the part engaging portion 18 formed below the clip main member 16 of the clip 14 for the fuel tank band, so that the heat insulator 30 can be attached to the fuel tank band 10 through the clip 14 for the fuel tank band.

As a result, it is possible to change the cross section of the fuel tank band 10 to the corrugated shape from the flat shape to secure the rigidity of the fuel tank band 10, and attach the heat insulator 30 to the fuel tank band 10. In addition, as compared to a conventional tightening by a bolt, it is possible to reduce the number of parts, assembling hours, and weight of the device, and also possible to improve corrosion resistance and serviceability.

In the present embodiment, in the clip 14 for the fuel tank band, the wings 20E of the upper part 20 of the clip main member 16 press the clip attaching portion 10A of the fuel tank band 10 against the projections 22D of the lower part 22 with elastic forces. As a result, it is possible to prevent rattling of the clip 14 for the fuel tank band after the assembly and a squeaking noise thereof.

As described above, the present invention is explained with reference to the specific embodiments. However, the present invention is not limited to the above-mentioned embodiments, and other various modifications can be made within the scope of the present invention. For example, in the above-mentioned embodiments, the heat insulator 30 as a part is fixed to the part engaging portion 18 of the clip 14 for the fuel tank band. However, a part other than the heat insulator 30 can be fixed to the part engaging portion 18 of the clip 14 for the fuel tank band.

Also, the cross section of the clip attaching portion 10A of the fuel tank band 10 and the cross section of the gap 24 between the upper part 20 and the lower part 22 of the clip main member 16 of the clip 14 for the fuel tank band are not limited to the above-mentioned embodiments and may be other shapes.

In the first and third embodiments where the integral hinge 40 is not used, it is easier to select resin for the clip 14 for the fuel tank band as compared to the second embodiment where the integral hinge 40 is used.

According to the first aspect of present invention, the attaching configuration for fixing a part to the fuel tank band comprises the clip for the fuel tank band in order to fix the part to the fuel tank band. The clip for the fuel tank band includes the clip main member for sandwiching the clip attaching portion with the upper part and the lower part with the gap corresponding to the cross section of the clip attaching portion of the fuel tank band; and the part engaging portion formed below the clip main member for engaging with the parts. Therefore, the part can be attached while the rigidity of the fuel tank band is secured.

According to the second aspect of the present invention, in the attaching configuration for the fuel tank band, the upper part and the lower part of the clip main member are separate members, thereby making a shape of a mold simple and reducing a cost.

According to the third aspect of the present invention, in addition to the features in the first and second aspects, the cross section of the clip attaching portion of the fuel tank band is different from that of the other portion of the fuel tank band, thereby preventing the clip for the fuel tank band from moving.

What is claimed is:

1. An attaching device for attaching a part member to an attaching portion of a band, comprising:
    a first part having a first base portion, a flat surface portion on the first base portion, and two rigid solid projections spaced apart from each other with the flat surface portion therebetween without a protrusion, said solid projections projecting outwardly from the flat surface portion of the first base portion and extending throughout an entire length thereof along a longitudinal direction of the first part,
    a second part assembled with the first part for forming a gap therebetween to sandwich the attaching portion of the band therein, said second part having a second base portion, and pressing portions formed in the second base portion to be spaced apart from each other and elastically projecting outwardly from the second base portion so that when the first and second parts are assembled, the pressing portions are located immediately above the solid projections for elastically pressing the attaching portion of the band on to the solid projections, and
    engaging means formed with the first and second parts for engaging the same.

2. An attaching device according to claim 1, wherein said second base portion includes slits to define wings therein, said wings projecting from an inner surface of the base portion as the pressing portions.

3. An attaching device according to claim 2, wherein said second part further includes reinforcing portions formed on the second base portion at longitudinal ends thereof to extend perpendicular to a longitudinal direction thereof, and a wall for connecting the reinforcing portions between the pressing portions, said reinforcing portions and said wall being integrally formed with the second part as one unit.

4. An attaching device according to claim 1, wherein said first part further includes first walls outside the solid projections having first engaging means, and said second part further includes second walls outside the pressing portions having second engaging means, said first and second engaging means engaging together when the first and second parts are assembled together.

5. An attaching device according to claim 1, wherein said first and second parts are formed separately.

6. An attaching device according to claim 1, wherein said first and second parts are integrated together with a hinge portion therebetween so that the first part rotates relative to the second part around the hinge portion.

7. An attaching device according to claim 1, further comprising a part engaging portion attached to the first part.

8. An attaching system for attaching a part member to a fuel tank, comprising a fuel tank band to be fixed to the fuel tank and having an attaching portion, and the attaching device according to claim 1.

9. An attaching system according to claim 8, wherein said fuel tank band has a cross section different from that of the attaching portion at a portion other than the attaching position.

10. An attaching device according to claim 4, wherein said first walls project from the first base portion substantially parallel to the solid projections, at least one of the first walls having an engaging claw, as the first engaging means, in a middle portion thereof defined by slits on the first wall.

11. An attaching device according to claim 10, wherein at least one of said second walls has an engaging hole, as the second engaging means, engaging the engaging claw.

* * * * *